Patented Nov. 20, 1934

1,981,799

UNITED STATES PATENT OFFICE 1,981,799

PURIFICATION OF PETROLEUM SULPHONATES

Hyym E. Buc, Roselle, N. J., assignor to Standard Oil Development Company, a corporation of Delaware No Drawing. Application July 29, 1932, Serial No. 626,233

12 Claims. (Cl. 260—159)

This invention relates to purified products obtained from treatment of petroleum oils with sulphuric acid, more particularly to oil-soluble sulphonates occasionally called mahogany sulphonates, and to methods of producing same.

One object of this invention is to produce valuable emulsifying agents from a material which heretofore has not been of much commercial value, and another object is to produce the same more economically and in a simple, efficient process. Still further objects and advantages of the invention will be apparent to those skilled in the art from the following specification.

When petroleum oils are treated with sulphuric acid in the manufacture of the well-known mineral white oils, the acid sludge formed settles to the bottom and is drawn off, while the upper layer of oil is neutralized with caustic soda or sodium carbonate and then treated with aqueous alcohol. This part-alcoholic solution settles to the bottom, extracting sulphonate soaps from the upper oil layer, which after filtering is then ready for the market as finished mineral white oil. The oil-soluble sulphonates are usually obtained from the alcohol solution by evaporation or other means but in the past they have not been sufficiently cheap, owing to the fact that the process of purification commonly used requires the evaporation of the alcoholic extract to dryness followed by a second treatment in which the crude soaps are taken up with strong alcohol. Nor is the product so obtained sufficiently and dependably free from mineral salts to permit their use as a high-grade emulsifier although they might be pure enough for less exacting purposes such as fat-splitting.

It is the intention of the present invention to produce emulsifying agents of such high quality that they will emulsify satisfactorily not only when used in amounts as great as 20% but rather only half that amount or even as low as 5%. Such powerful emulsifying agents are particularly useful in making emulsions by means of the homogenizer where only a small amount of emulsifying soap is required.

According to the present invention, highly purified soaps are obtained directly from the crude aqueous-alcoholic solution in the following manner:

The solution is first treated with a dehydrating agent, at least equivalent in dehydrating power to sodium carbonate monohydrate, in sufficient quantity to substantially dehydrate the alcohol, and then allowed to settle into two layers. The upper alcoholic layer is drawn off, settled, filtered if necessary, and evaporated to dryness, leaving as a residue the purified oil-soluble sulphonates, which are now suitable for use as emulsifying agents; the alcoholic vapors are condensed and used over again for further extractions. The lower layer consists of water, dehydrating agent, and the water-soluble impurities removed from the alcoholic solution of oil-soluble sulphonates; this layer is evaporated so as to remove most of the water and the residue having renewed dehydrating capacity may be used over again until the impurities accumulate too much, when it is then discarded and replaced by a supply of fresh dehydrating agent.

For the sake of illustration only, and not desiring to be limited by any of the details, the following specific example is given. The acid treated petroleum oil is first given an alkaline wash to remove at least most of the sulphuric acid and is then extracted with a 50% aqueous solution of isopropyl alcohol. After agitation and settling, the upper oil layer will be practically free from sulphonate compounds and the lower layer consisting of the aqueous alcohol will usually contain from 3 to 10% of oil-soluble sulphonates in solution. After removing the oil, the alcoholic layer is made neutral to phenolphthalein by addition of either sulphuric acid or carbon dioxide in order to neutralize any free alkali which might be present. The sodium carbonate monohydrate is added until, after agitation and settling, the upper layer upon filtering is practically neutral. This will usually require from two to four pounds of the carbonate per gallon of water in the alcoholic solution treated. The temperature is immaterial but should preferably be above 32° C., the melting point of the polyhydrate salts formed. The mixture is agitated thoroughly and settled, separately evaporating both layers as described above, avoiding any prolonged heating of the soap, preferably evaporating at under 150° C. The resulting product contains purified oil-soluble sulphonates having enhanced properties as an emulsifying agent.

If desired, before treating with the alkaline carbonate, a preliminary treatment may be given with anhydrous sodium sulphate. This acts similarly to the sodium carbonate but is not as effective and merely serves to partially reduce the ionizable salt content of the alcoholic layer. The treatment with sodium carbonate described above will then still further reduce this salt content down to the desired extent.

As mentioned above, although not always necessary, the purified alcoholic solution before evaporation may be filtered through any suitable medium such as paper, siliceous earths, charcoal, silica gel, felt, etc. Also it may be desirable, in case there should be any excess alkali carbonate present, to neutralize the purified alcoholic solution as by adding a fatty acid, for example oleic acid, after which the solution is then evaporated to dryness. Such an addition of oleic acid serves another purpose besides a mere neutralization, namely, it stabilizes the product as explained in U. S. Patent 1,811,535.

Instead of using isopropyl alcohol for extracting the oil-soluble sulphonates from the acid treated oil, other solvents may be used such as acetone or any of the other water-soluble alcohols higher in molecular weight than ethyl alcohol and even the latter may be used if an exceptionally strong dehydrating agent such as anhydrous potassium carbonate is used. Generally sodium carbonate is not sufficiently strong to dehydrate ethyl alcohol to the extent desired for preparing highly purified emulsifying agents in accordance with the present invention.

The dehydrating agent, although I prefer to use sodium carbonate monohydrate when isopropyl alcohol is the solvent, may be any water-soluble salt which will effect dehydration and separation of the solvent used and which will not react with the oil-soluble sulphonates to produce insoluble compounds or in any other way cause a deleterious effect on the purification process. The sodium carbonate may be either dry (anhydrous) or may contain not more than 20% combined water and it should preferably be substantially free from chlorides or other salts more soluble in water-alcohol mixtures than the carbonates. The dehydrating capacity of the dehydrating agent should preferably be such that it will reduce the ionizable salt content of the alcohol layer down to .05% or less. If the commercial dehydrating agent available, such as sodium carbonate monohydrate, contains too much chlorides, some of the latter may be removed by any suitable means or the first one or two batches of oil-soluble sulphonates produced may be used for purposes requiring a lesser degree of purity than a high grade emulsifier. In other words, successful batches of the oil-soluble sulphonate product will become relatively freer of ionizable salt when the dehydrating agent is used repeatedly for a number of treatments.

The entire process may be made continuous by continuously treating fresh alcoholic solution of oil-soluble sulphonates with the dehydrating agent, continuously effecting a separation either by settling or any other suitable means into a dehydrated alcohol layer and an aqueous layer and continuously and separately evaporating both of these layers, condensing the vapors of the alcohol or other solvent used and recycling it in the continuous extraction process and also recycling the regenerated dehydrated agent.

My invention has many manifest advantages among them being the production of valuable emulsifying agents substantially free from highly dissociable or ionizable salts, the production of purified oil-soluble sulphonates by an economical and efficient process which permits the repeated use of both the solvent and dehydrating agent, the chief raw materials other than the actual source of the sulphonates themselves, a process much simpler than many others heretofore proposed in that it requires but a single evaporation to produce the finished and purified oil-soluble sulphonates, and a further advantage of converting a former practically waste material into a valuable by-product of the petroleum industry.

As the specific illustration given may be subject to various changes without departing from the scope of the invention, I desire to claim all inherent novelty therein as broadly as the prior art permits.

I claim:

1. The process of obtaining purified oil-soluble sulphonates from petroleum oils, comprising treating the oil with sulphuric acid, washing with a neutralizing agent, extracting sulphonate compounds with an aqueous solution of a solvent, treating said resulting aqueous solution with a dehydrating and separating agent, separating into two parts, namely, solvent and aqueous, and evaporating the solvent part to dryness.

2. The process according to claim 1, in which the evaporated solvent vapors are condensed and used again for extraction of fresh acid-treated oil.

3. Process according to claim 1, in which the aqueous solvent extract solution is neutralized of any free alkali before adding the dehydrating agent.

4. Process according to claim 1, in which the dehydrated solvent part is filtered before evaporating it to dryness.

5. Process according to claim 1, in which the dehydrated solvent part is neutralized before evaporation.

6. Process according to claim 1, in which the treatment with a dehydrating and separating agent is carried out in several steps using successively stronger dehydrating agents in the various steps.

7. An improved oil-soluble sulphonate product derived from petroleum oils by treating with sulphuric acid, washing the acid treated oil with a neutralizing agent, extracting the neutralized oil with an aqueous solution of a solvent and separating the resulting solution, adding a dehydrating and separating agent to the separated solvent solution, separating the mixture of said solvent solution and said dehydrating agent into two parts, and evaporating the separated dehydrated solvent solution to dryness.

8. In the separation of sulphonates from sulphuric acid treated petroleum oil by methods comprising neutralizing said oil with an alkali, contacting said oil with an aqueous solvent for said sulphonates and separately withdrawing the resulting aqueous solvent solution of sulphonates, a process for obtaining sulphonates of high purity from said aqueous solvent solution comprising contacting the withdrawn solution with a dehydrating agent insoluble in said solvent, withdrawing the resulting dehydrated solution of said sulphonates and recovering said sulphonates therefrom.

9. Process according to claim 8 in which the solvent is a water soluble alcohol.

10. Process according to claim 8 in which the dehydrating agent is sodium carbonate monohydrate.

11. The process of obtaining purified oil-soluble sulphonates from petroleum oils, comprising treating the oil with sulphuric acid, washing with a neutralizing agent, extracting sulphonate compounds with an aqueous solution of isopropyl alcohol, treating said resulting aqueous solution with a dehydrating agent insoluble in isopropyl alcohol, separating into two parts, namely, solvent and aqueous and evaporating the solvent part to dryness.

12. The process according to claim 11, in which the dehydrating agent is anhydrous potassium carbonate.

HYYM E. BUC.